Figure 1:
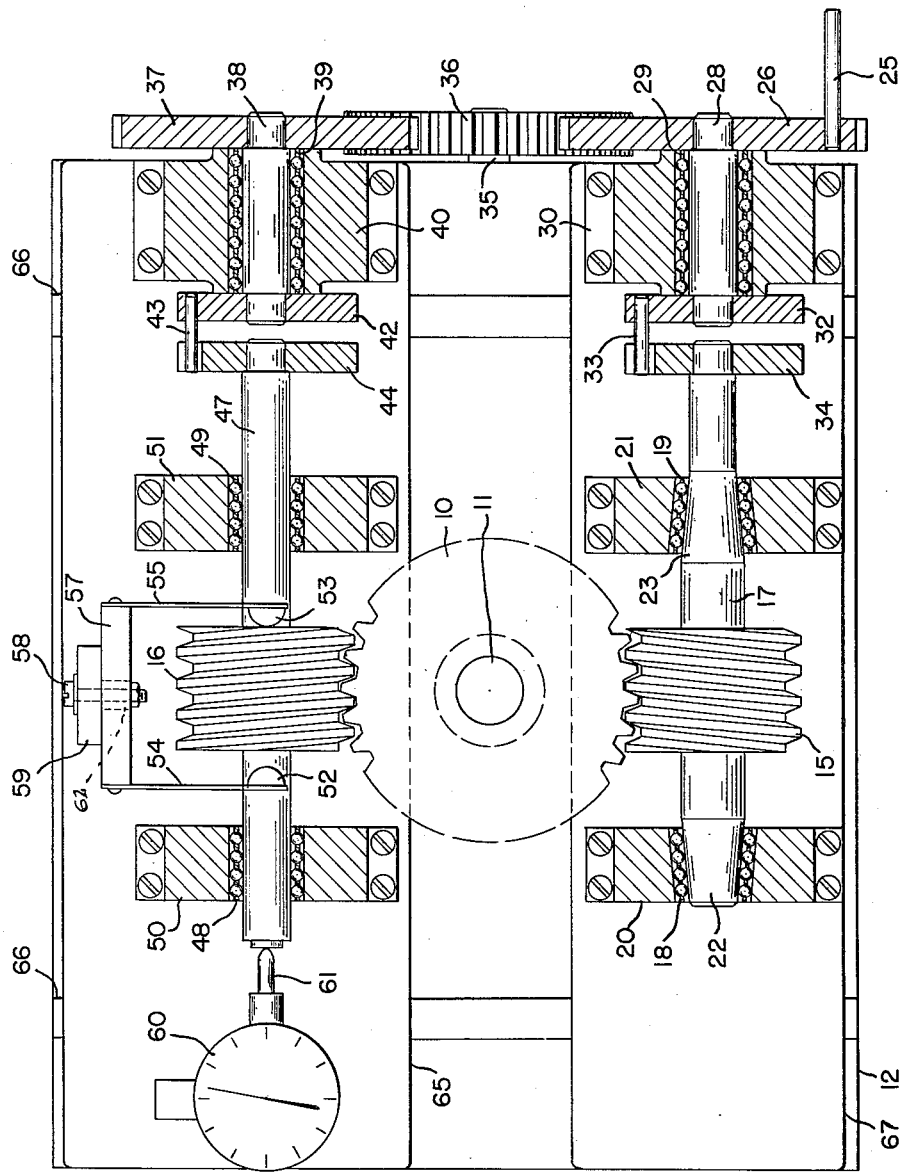

July 17, 1962 — A. H. CANDEE ETAL — 3,044,176
APPARATUS FOR TESTING GEARS
Filed March 23, 1959

INVENTORS
ALLAN H. CANDEE AND
GEORGE O. RICHMOND
BY
Attorney

United States Patent Office 3,044,176
Patented July 17, 1962

3,044,176
APPARATUS FOR TESTING GEARS
Allan H. Candee, 404 Hillside Ave., Rochester 10, N.Y., and George O. Richmond, 4 Upper Crescent, East Rochester, N.Y.
Filed Mar. 23, 1959, Ser. No. 801,100
4 Claims. (Cl. 33—179.5)

The present invention relates to apparatus for testing gears, and more particularly to apparatus for testing cylindrical gears, spur and helical. In a still more specific aspect, the invention relates to apparatus for testing the accuracy of tooth shape, the tooth spacing, and the concentricity of such gears.

Various methods have been employed heretofore for testing spur and helical gears. In some cases the gear is checked one tooth at a time. Other methods of testing involve running the gears individually with master gears and checking their change, if any, in center distance. Still another method is to mount the mating gears, which are to be tested, in mesh upon spindles to which are secured discs which have diameters equal to the pitch diameters of the respective mating gears; and to rotate the gears together and compare the rotary motion produced by the discs with the rotary motion produced by the gears themselves. Tests are also made by running the mating gears together and observing the tooth bearing they have or the sound they produce, or both.

When the gears are checked one tooth at a time, various tests may be made. For testing tooth profile shapes, a feeler member may be moved depthwise of the tooth profile from top to bottom. This feeler member may record its movement on, for instance, a dial gauge or a graph. The tooth spacing of the gears can be tested by use of micrometer-like gauges which contact several teeth simultaneously. The testing of individual teeth for profile shape and pitch, or tooth spacing, is obviously time-consuming; and therefore expensive. On the other hand, master gears are costly and difficult to manufacture. A master gear for testing a gear of three inch diameter, for instance, may have thirty or forty teeth; and every tooth has to be perfect; otherwise it is useless as a testing medium. A master gear, as ordinarily used, must, moreover, contact the gear, which is to be tested, on both sides of the teeth of the gear in order to show variations in center distance. This is an artificial, non-working condition. In fact, in the operation of gears some backlash between the teeth usually exists, which means that with the gears at a fixed center distance there will be contact only on one side of the teeth. Furthermore, where there is contact on both sides of the same tooth in testing, it is impossible to know whether one side only, or both sides, of the teeth of the gear under test are in error. With a master gear, moreover, if there is any inaccuracy in the gear being tested, it is very difficult to identify which individual tooth is inaccurate, and what its inaccuracy is. If there is something wrong with the gears, the test tells at most that something is wrong but not what is wrong. Apparatus for testing gears using rolling pitch discs is costly. So are apparatus for sound- or noise-testing gears. Moreover, such apparatus, and apparatus for testing tooth bearing, do not tell what is wrong but only that something is wrong.

One object of the invention is to provide gear testing apparatus with which a spur or helical gear can be tested for tooth profile shape, pitch, and concentricity, without having to test the teeth of the gear individually, and yet which will be relatively simple in construction.

Another object of the invention is to provide a testing apparatus of the character described which will offer a more reliable check as to the accuracy of the gears than testing apparatus of this nature previously built.

Another object of the invention is to provide apparatus of the character described which will enable the gears to be tested while they are in continuous, constant motion, and without requiring that they be intermittently stopped and started.

Another object of the invention is to provide apparatus of the character described in which the basic testing members employed will cost only about one-fifth as much as a master gear.

A further object of the present invention is to provide a testing apparatus which can employ involute worms for controlling the testing operation. Such worms can be ground very accurately. In fact, thread grinding machines are generally recognized as being more accurate in their results than gear grinding machines.

A still further object of the invention is to provide testing apparatus of the character described in which one of the control worms need have an accurate thread for only about one and a half convolutions on one side of the thread.

A still further object of the present invention is to provide testing apparatus of the character described with which the positions of the individual teeth can readily be identified, and checked.

Other objects of the invention will be apparent hereinafter from the specification and from the recital of the appended claims.

In the drawing:

FIG. 1 is a more or less diagrammatic sectional view showing apparatus built according to one embodiment of this invention for testing a spur gear.

Referring now to the drawing by numerals of reference, 10 denotes the gear which is to be tested. It is mounted to rotate on a shaft 11 which may be fixedly secured to the base 12 of the testing apparatus.

For testing the gear 10, two accurately ground, single-thread worms 15 and 16 may be employed. These worms have a lead of thread corresponding to the pitch of the gear, which is to be tested, and are accurately ground to mesh correctly with the gear. These worms are identical in dimensions and form, except that in the arrangement shown in the drawing one has a right-hand thread and the other a left-hand thread. They are mounted to engage the gear 10 on diametrically opposite sides thereof, and to rotate in the same direction on parallel axes. In the embodiment shown, the worm 15 acts as the driver. It is secured to a shaft 17 that is mounted in opposed antifriction axial thrust bearings 18 and 19 in two pillow blocks 20 and 21 that are secured to a plate 67 that is slidably adjustable on the base 12. The shaft 17 has conical portions 22 and 23 which fit into the thrust bearings 18 and 19, respectively, so that movement of the shaft axially in either direction is prevented.

In the embodiment of the invention shown, the test apparatus is adapted to be manually operated by rotating the handle 25 which is secured to a spur gear 26 that is keyed or otherwise fastened to a shaft 28. This shaft is journaled by means of an antifriction bearing 29 in a pillow block 30 that is also secured to the slide 67. The shaft 28 is connected by a coupling member 32, a pin 33 and a coupling member 34 to the shaft 17 so that the shaft 17 is rotated upon rotation of the crank 25.

The gear 26 meshes with a gear 36, which is journaled on a stud 35 that is secured in the base 12. The gear 36, in turn, meshes with a gear 37, which is keyed, or otherwise fastened to a shaft 38. Shaft 38 is journaled on antifriction bearings 39 in a pillow block 40 that is secured to a slide 65 which is adjustable on base 12 toward and from slide 67 and shaft 11. A coupling member 42, a pin 43, and a coupling member 44 connect the shaft 38 to a shaft 47 upon which the worm 16 is fixedly mounted.

The shaft 47 is journaled for rotation and axial sliding movement on antifriction bearings 48 and 49 in pillow blocks 50 and 51, respectively, that are secured to the slide 65. Leaf springs 54 and 55 operate through contact members 52 and 53, respectively, to press the worm 16 resiliently in one direction or the other to cause contact between the worms and the gear 10 to take place on one side or the other of the gear teeth.

The leaf springs 54 and 55 are carried by a block 57, which is slidably adjustable laterally on a bracket 59 that is mounted on the slide 65. A bolt 58, that extends through a slot 62 in block 57, serves to secure the block in any adjusted position on bracket 59. By adjusting the block on the bracket, the contact members 52 and 53 can be positioned to engage against opposite end faces, respectively, of the worm 16. The worm 15 is in contact with only one side of the teeth of the gear 10, and the worm 16 is in contact only with that same side of the gear teeth in any one position of the block 57. This is an important feature of the invention. The contact must be only on one side of the teeth. The gearing 26, 36, 37 is selected so that the shafts 17 and 47 are driven at the same rate of speed and in the same direction when the handle 25 is rotated. If desired, a friction disc may be used to apply enough resistance against turning to the gear 10 to secure the required positive drive. The gear may be secured on the stud 11 by a nut and bolt, and the friction disc may be secured between the nut and the upper face of the gear.

Axial movement of the shaft 47 is read by a standard dial indicater 6, the plunger 61 of which engages against the end of the shaft 47.

To test a gear 10, the gear is mounted on the shaft 11, and the two worms 15 and 16 are brought into engagement with the teeth of the gear 10. For testing gears of different diameters, it will be obvious that the shafts 17 and 47, and the worms 15 and 16 carried thereby, will have to be adjusted to different distances apart. The slides 65 and 67 permit of this adjustment. They may be mounted to slide on ways 66 on base 12.

In testing the gear 10, the handle 25 is rotated to rotate the gear 10 by engagement of the worm 15 therewith. Simultaneously the worm 16 will rotate in engagement with the gear 10, being driven by the gearing 26—36—37. If the gear 10 is accurate, there will be no axial movement of the shaft 47. If there is any inaccuracy in the teeth of the gear 10, however, as for instance, any inaccuracy in spacing, or profile shape of the gear teeth, or if the gear is eccentric, then the master worm 16 and the shaft 47 will have to move axially to compensate for this inaccuracy. The indicator 60 will indicate the amount of this movement.

Since the worms are single thread worms, one turn of a worm corresponds to a movement of the gear through one tooth pitch. By keeping a record of the reading of the indicator dial, it can be determined then very readily what tooth, or teeth of the gear were in engagement with the worm 15 when axial movement of the shaft 47 occurred. Thus, anyone skilled in the art can readily determine from this record whether the spacing of the teeth is accurate or not, and whether the profile or profiles of a particular tooth or teeth is or are inaccurate or not, and whether the gear is eccentric, or not.

Obviously, a recording gauge can be substituted for indicator 60 to draw a graph on paper, which provides a permanent record of a gear after it has been tested.

For testing involute gears, worms 15 and 16 are formed with accurately ground involute threads, which can readily be produced on modern thread grinding machines. The only thing that is necessary it that the worms themselves be accurate and that they be mounted on parallel axes. A thousandth of an inch error in the connecting gears 26, 36, 37 is reduced by the worm and the angle of its thread to about one-twentieth of that error. The worms should cost only about one-fifth of the cost of a master gear.

The connecting gears 26, 36 and 37 themselves can be ground accurately.

Helical gears can be tested by mounting two such gears on parallel axes and engaging one of the gears with one worm 15 and the other gear with the other worm 16. In this event, of course, two spindles 11 will have to be provided for mounting the two gears. The two helical gears should be mounted on axes tilted to the same angle, and tilted at the helix angle of the gears to the axes of the shafts 17 and 47.

The present invention has the advantage that the test members can be ground most accurately. Moreover, the transmission of motion in the measuring apparatus is by direct contact of the threads of the worms, and is positive and reliable, whereas transmission by rolling contact and friction between discs and bars as in previously used apparatus is comparatively unreliable and inconvenient. The apparatus of the present invention has advantage also, because the gears are in constant motion; the operation, therefore, proceeds smoothly and continuously. Because the measurement of error is made with contact on only one side of a tooth, close exactness of center distances between the gear or gears being tested and the master worms is not necessary. Furthermore, measuring with contact on only one side of the teeth makes it possible to determine which side of a tooth is at fault. The presence of eccentricity or run out is made apparent. Because one turn of the single thread driving master worm means a displacement of one tooth in the rotation of the gear being tested, it is comparatively easy to locate the position of an observed error on an individual tooth. Except that the axes of the worms used as gauging elements must be parallel, there is a wide choice of arrangements of the apparatus according to purpose and convenience.

In a modification from the apparatus illustrated, the present invention may be adapted to carry out what has long been known as the "180-degree check" in which circumferential errors in a gear are measured by the relative positions of a pair of teeth 180 degrees apart around the gear. For this purpose, instead of using a complete worm 15, a drive worm is provided which is of the intermittent type, namely, that is, which has an operating portion that extends around its body only about one and one-third or one and one-half turns, and contains a central portion of zero lead, which acts like the dwell on a cam, and portions at each side of the central portion which have a given lead. A gauging member is also substituted for worm 16. This member is provided not with a thread but with a single annular rib or tooth extending around it for about one quarter of its circumference and of a form adapted to contact with either side of the teeth of the test gear. The connecting gears 26, 36 and 37 are then assembled in such relation that the rib on the gauging member is in position for contact with the gear that is to be tested, when the intermittent worm is holding the gear stationary. At that time the indicator 60 is observed; or if a recording gauge is being used, the axial position of shaft 47 can be read on the chart. During the time when the thread of the intermittent worm is advancing the gear being tested to the next tooth position, the rib of the gauging member will be out of contact position. In the past the "180-degree check" has been carried out in a step-by-step manner with the changes from tooth to tooth made by hand, which is both laborious and time-consuming. By employing the intermittent worm and ribbed member, the operation becomes automatic and continuous.

Although in the foregoing description, particular emphasis is given to single-thread involute worms as gauging members for testing spur gears, it is obvious that a helical gear can be similarly tested by employing two multi-threaded worms of a lead angle to match the helix angle of the gear and which mesh with the gear with their axes at 90° to the gear axis. These worms can be of the same hand. For testing the helical gear, the gearing connecting the two worms will be arranged to rotate the worms simultaneously in opposite directions.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. Apparatus for testing cylindrical gears comprising means for rotatably supporting a gear to be tested, a threaded member engaged with the teeth of the gear on one side of the axis of said gear, a threaded member disposed at the opposite side of the gear axis, each of said members being rotatable, the second-named threaded member being also displaceable in the direction of its axis of rotation, means for rotating the first-named threaded member to rotate the gear by engagement of the first-named threaded member therewith, means for rotating said second-named threaded member in unison with said first-named threaded member upon rotation of said first-named threaded member, said second-named member being operatively engaged with the gear, means for holding said first-named threaded member against axial movement, and means for indicating any axial displacement of said second-named threaded member.

2. Apparatus for testing cylindrical gears comprising means for rotatably supporting a gear to be tested, a rotary single thread worm engaged with the gear at one side of the gear axis, means for holding said worm in fixed axial position, a threaded member disposed at the opposite side of the gear axis to be operatively engaged with the gear and to rotate on an axis parallel to the axis of rotation of said worm and to be displaceable in the direction of its axis, means for rotating said worm on its axis, means for rotating said threaded member on its axis in unison with the rotation of said worm, and means for indicating any axial displacement of said threaded member.

3. Apparatus for testing cylindrical gears comprising means for rotatably supporting a gear to be tested, a first single thread worm engageable with the teeth of the gear at one side of the gear axis, means for holding said worm in fixed axial position, a second single thread worm disposed at the diametrically opposite side of the gear axis to be operatively engaged with the gear and to rotate on an axis parallel to the axis of rotation of said first worm and to be displaceable in the direction of its own axis, said worms being identical except as to hand of thread, means for rotating the first worm to rotate said gear, means for rotating the second worm at a constant one-to-one ratio in unison with the rotation of the first worm, and means for indicating any axial displacement of said second worm.

4. Apparatus for testing cylindrical gears comprising means for rotatably supporting a gear to be tested, a first single thread worm adapted to mesh in fixed axial position with said gear at one side of the gear axis, means for holding said first worm against axial movement, a second single thread worm identical, except as to hand of thread, with said first worm and disposed to mesh with said gear at the diametrically opposite side of the gear axis, said second worm being mounted to rotate on an axis parallel to the axis of rotation of said first worm and to be displaceable in the direction of its own axis by contact with said gear, means for rotating said first-named worm, gearing for driving said second-named worm at a constant one-to-one ratio in unison with said first-named worm upon rotation of said first-named worm, and means for indicating any axial displacement of said second-named worm as it rotates in engagement with the gear, thereby to indicate any inaccuracy in the action of the teeth of the gear.

References Cited in the file of this patent

UNITED STATES PATENTS

| | | |
|---|---|---|
| 1,263,472 | Saurer | Apr. 23, 1918 |
| 1,374,698 | Wilkinson | Apr. 12, 1921 |
| 1,483,419 | Eaton | Feb. 12, 1924 |
| 2,855,691 | Cunningham | Oct. 14, 1958 |